United States Patent [19]

Takeuchi et al.

[11] Patent Number: 5,685,146
[45] Date of Patent: Nov. 11, 1997

[54] POWER STEERING APPARATUS WITH A FLOW CONTROL UNIT

[75] Inventors: Yoshiyuki Takeuchi, Gamagori; Shuji Takagi, Okazaki, both of Japan

[73] Assignee: Toyoda Koki Kabushiki Kaisha, Kariya, Japan

[21] Appl. No.: 652,275

[22] Filed: May 22, 1996

[30] Foreign Application Priority Data

May 23, 1995 [JP] Japan ................................. 7-123634

[51] Int. Cl.$^6$ ........................... F16D 31/02; F15B 9/10
[52] U.S. Cl. ........................... 60/468; 60/494; 91/375 R
[58] Field of Search ........................... 91/434, 375 R; 60/468, 494, 384; 180/141

[56] References Cited

U.S. PATENT DOCUMENTS

| | | | |
|---|---|---|---|
| 4,000,785 | 1/1977 | Nishikawa et al. | 91/434 X |
| 4,676,334 | 6/1987 | Nakamura et al. | 91/434 X |
| 4,913,102 | 4/1990 | Ohmura et al. | |
| 5,471,838 | 12/1995 | Suzuki et al. | 91/375 R X |

FOREIGN PATENT DOCUMENTS 6-63888  9/1994  Japan .

Primary Examiner—Hoang Nguyen
Attorney, Agent, or Firm—Oblon, Spivak, McClelland, Maier & Neustadt, P.C.

[57] ABSTRACT

A power steering apparatus of the present invention which includes a pump, a power cylinder, a control valve, an orifice arranged in a supply passage leading an operating fluid discharged from the pump to the control valve, a flow control valve, and a switching valve. A spring chamber of the flow control valve is connected to the supply passage downstream of the orifice, and is responsive to the pressure difference across the orifice for regulating the flow rate of an operating fluid to the control valve to an almost constant flow rate. The switching valve is actuated in response to the differential pressure across the orifice for switching the communication of the spring chamber between the downstream of the orifice and the reservoir. When the differential pressure across the orifice is relatively low, the switching valve brings the spring chamber into communication with the reservoir. With this configuration, an excessively high pressure is not maintained in the pump, and an increase in the temperature of the operating fluid which brings about seizure of the pump can be prevented.

4 Claims, 5 Drawing Sheets

POWER STEERING APPARATUS WITH A FLOW CONTROL UNIT

BACKGROUND OF THE INVENTION

1. Field of the Invention

The present invention relates to a power steering apparatus having means for preventing the pressure of an operating fluid from rising beyond a certain value during steering at a maximum rotational angle.

2. Discussion of the Prior Art

In a hydraulic power steering apparatus for use in an automobile and the like, when a steering wheel is held at the maximum rotational angle and when a driver rotates the steering wheel forcibly under the condition that road wheels are mired in a ditch, the pressure of the operating fluid is extremely raised, resulting in an oil leakage and damage to seals. To avoid the excessive rise in the pressure of the operating fluid, the power steering apparatus is generally provided with a relief valve which prevents the pressure of the operating fluid from rising beyond a certain value.

However, the power steering apparatus having the relief valve involves some drawbacks. Since the relief valve is functionally designed to actuate under a high pressure, when the steering wheel is held at the maximum rotational angle and when the driver rotates the steering wheel forcibly under the condition that road wheels are mired in a ditch, the pressure in the pump is disadvantageously maintained to a high relief pressure P, as shown between point a and b in FIG. 8. The high pressure in the pump leads increase in the temperature of the operating fluid, whereby the pump seizes up. Besides, the pump operation under the high pressure becomes a heavy load on an engine to bring deterioration of the fuel consumption.

SUMMARY OF THE INVENTION

Accordingly, it is an object of the present invention to provide an improved power steering apparatus which can prevent the pressure in a pump from being maintained at too high a level during steering at a maximum rotational angle and the like, with a simple construction.

Another object of the present invention is to provide an improved power steering apparatus capable of switching the pressure in a spring chamber of a flow control valve.

Briefly, the power steering apparatus of the present invention comprises a pump, a power cylinder, a control valve, an orifice arranged on a supply passage leading the operating fluid discharged from the pump to the control valve, a flow control valve, and a switching means. In the control valve, variable throttles are arranged on paths connected to the pump, both fluid chambers of the power cylinder, and a reservoir. The flow control valve has a spring chamber connected to the supply passage downstream of the orifice, and is responsive of the pressure difference across the orifice for regulating the flow rate of an operating fluid to the control valve to an almost constant flow rate. The switching means is actuated in response to the differential pressure across the orifice for switching the communication of the spring chamber of the flow control valve between the downstream of the orifice and the reservoir.

With this configuration, the control valve restrictively controls the flow of the operating fluid depending upon the rotational direction of the steering wheel. During normal steering, the operating oil is supplied to the control valve through the orifice, and the pressure in one of chambers of the power cylinder is raised to start the power assist. Since the differential pressure across the orifice is high, the switching means is switched so that the spring chamber of the flow control valve is communicated with the downstream side of the orifice. Therefore, the normal flow control by the flow control valve is therefore carried out.

In the situation where the steering wheel is held at the maximum rotational angle and when a driver forcibly rotates the steering wheel in one direction under the condition that road wheels are mired in a ditch, the operating fluid does not flow through the orifice because the operating fluid is intercepted by the closed control valve. This decreases the differential pressure across the orifice. The switching means is then switched so that the spring chamber of the flow control valve is released to a low-pressure side. The pressure in the spring chamber of the flow control valve is lowered to increase the amount of the bypassed operating fluid. Namely, the pressure in the pump is lowered by draining the operating fluid more.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
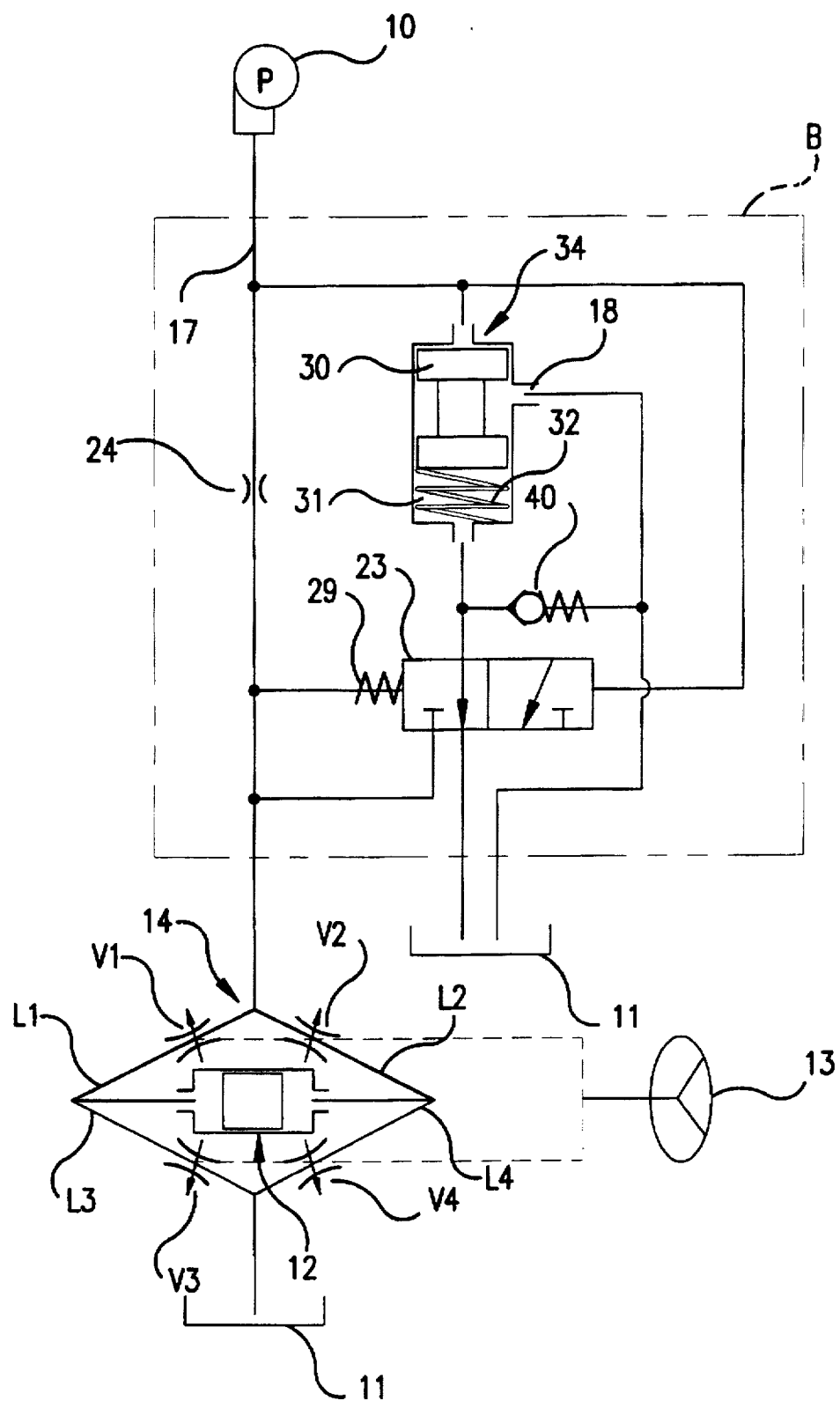
FIG. 1 is a hydraulic system diagram of a power steering apparatus according to the first embodiment of the present invention.

Referring now to FIG. 1, a hydraulic power steering apparatus according to the present invention is mainly composed of a pump 10 which is driven by an automotive engine not shown, a reservoir 11, a power cylinder 12 for assisting the steering operation, a rotary control valve 14 for restrictively controlling the flow of operating fluid from the pump 10 to the power cylinder 12 upon rotation of a steering wheel 13.

Figure 2:
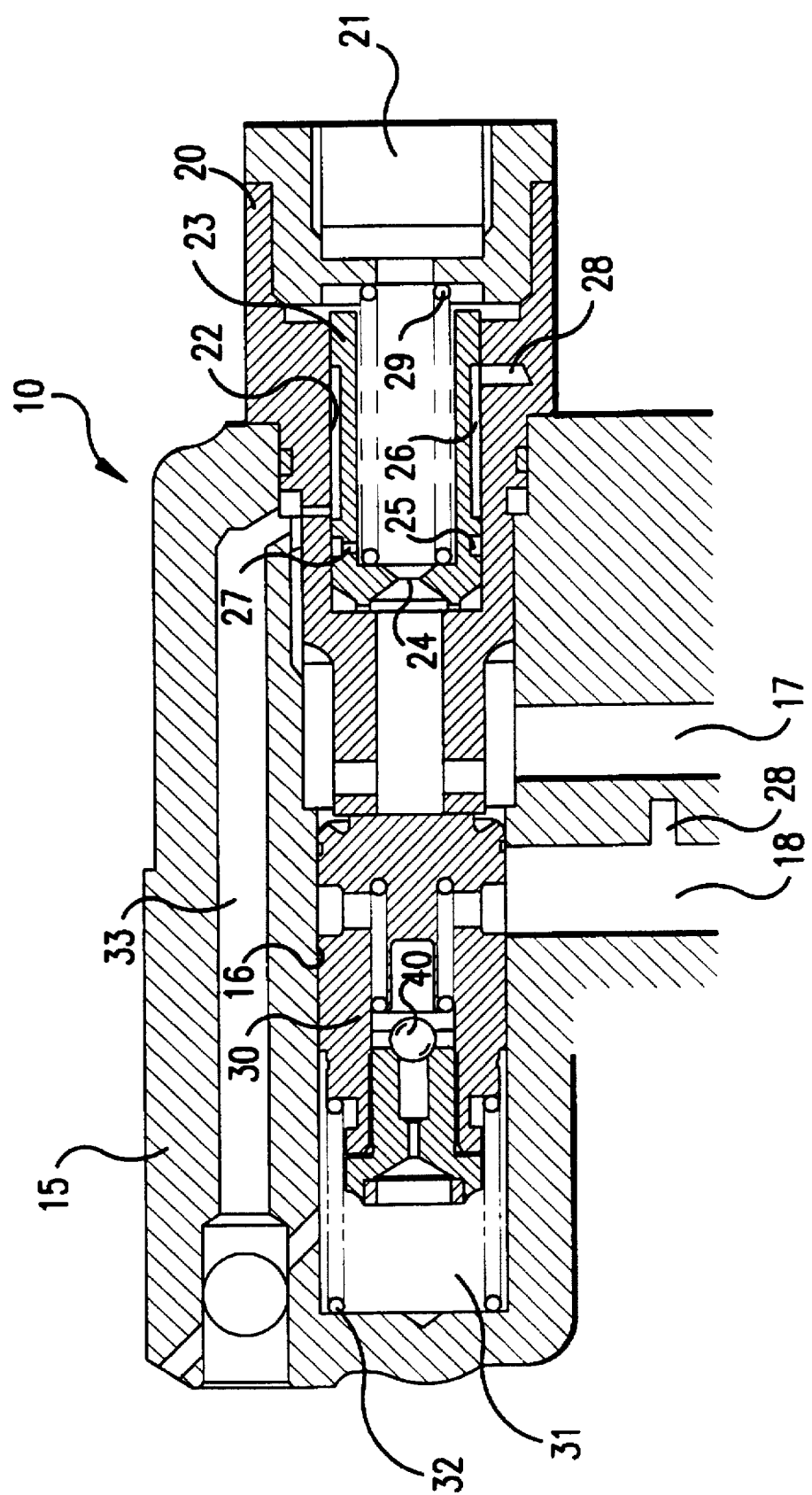
FIG. 2 is an enlarged sectional view of the portion B in FIG. 1 which constitutes a flow control unit of the power steering apparatus.

FIG. 2 shows a sectional view of the portion B in FIG. 1 which constitutes a flow control unit of the power steering apparatus. Numeral 15 denotes a pump housing of the pump 10, in which a valve receiving bore 16 is formed. A supply passage 17 and a bypass passage 18 are formed at axially spaced points to open to the valve receiving bore 16 for connections respectively to an exhaust port and a suction port of the pump 10.

A union 20 is threadedly engaged with one end of the valve receiving bore 16. The union 20 is provided at its one end with an outlet port 21 connected to the control valve 14. In a bore 22 of the union 20, a switching valve 23 responsive to differential pressure is slidably received. The switching valve 23 is formed therein with a metering orifice 24 through which the supply passage 17 is communicated with the outlet port 21. On the outer surface of the switching valve 23, first and second annular grooves 25 and 26 are formed with a predetermined space in a sliding direction of the switching valve 23. The first annular groove 25 is in communication with the downstream side of the metering orifice 24 through a pin hole 27, while the second annular groove 26 is in communication with the bypass passage 18 through a detour path 28. The switching valve 23 is urged toward the supply passage 17 by a spring 29.

A spool 30 is slidably received in the valve receiving bore 16 and is urged by a sprang 32 in a spring chamber 31 formed at the end of the spool 30 opposite to the switching valve 23, whereby the communication between the supply and bypass passages 17 and 18 are restricted. In the pump housing 15, a connection passage 33 extending in the axial direction is formed to be communicated at one end with the spring chamber 31 and at the other end with either the first or the second annular grooves 25, 26. The metering orifice 24, the spool 30 and the spring 32 constitute a flow control valve 34. Numeral 40 denotes a relief valve which actuates when the pressure in the spring chamber 31 of the flow control valve 34 exceeds a preset pressure so as to release the pressure therein to a low-pressure side (the bypass passage 18).

The switching valve 23 having the above-mentioned construction also actuates in response to the differential pressure across the metering orifice 24. In the situation where the differential pressure across the metering orifice 24 is smaller than the spring force of the spring 29, the switching valve 23 is maintained to its sliding end by the spring 29. In this state, the second annular groove 26 of the switching valve 23 is opened to the connection passage 33 connected to the spring chamber 31. When the differential pressure across the metering orifice 24 becomes larger than the spring force of the spring 29 with an increase in the rotational speed of the pump 10, the switching valve 23 begins to be moved against the spring 29 to the right as viewed in FIG. 2, so that the first annular groove 25 of the switching valve 23 is opened to the connection passage 33.

Turning back to FIG. 1, the control valve 14 which is well-known is schematically illustrated. The control valve 14 has four variable orifices V1, V2, V3 and V4 of center-open type disposed in the line of fluid paths L1, L2, L3 and L4 which are respectively connected to the pump 10, both opposite fluid chambers of the power cylinder 12, and the reservoir 11. All of the variable orifices V1, V2, V3 and V4 are closed under a state such that the steering wheel 13 is steered at the maximum rotational angle.

The operation of the power steering apparatus as constructed above will now be described with reference to FIG. 2 and FIGS. 3–5 which are schematic diagrams of FIG. 2.

Figure 3:
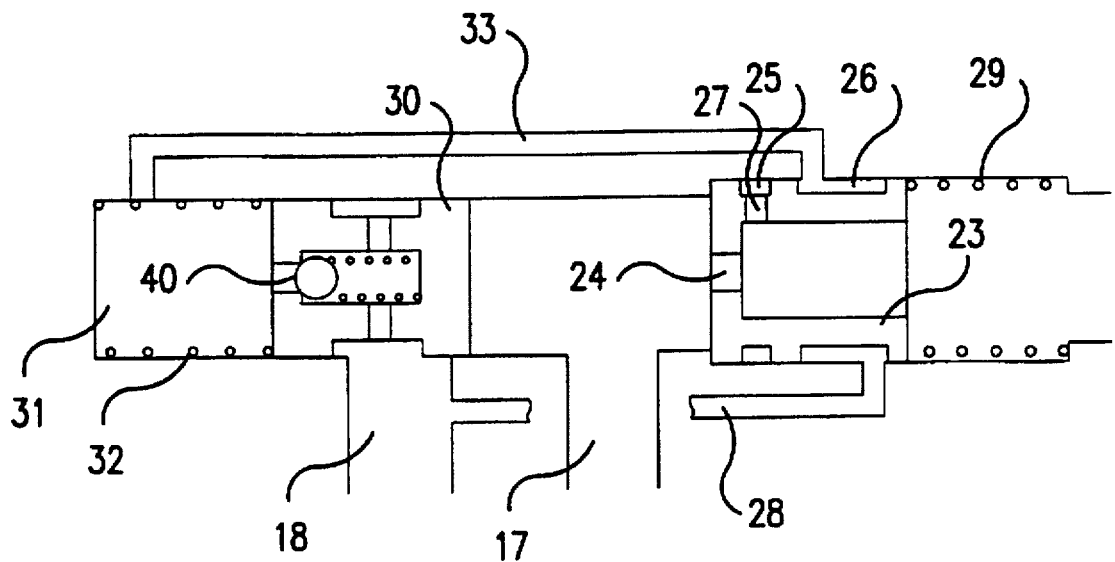
FIG. 3 is a schematic diagram of the flow control unit shown in FIG. 2.

When the operation of the pump 10 is initiated by the automotive engine from the state shown in FIG. 3 (FIG. 2), the operating fluid is supplied from the exhaust port of the pump 10 to the supply passage 17. The operating fluid discharged to the supply passage 17 is then supplied from the outlet port 21 of the union 20 to the control valve 14 through the metering orifice 24, and is then drained to the reservoir 11 through the variable orifices V1–V4 of the control valve 14.

Figure 4:
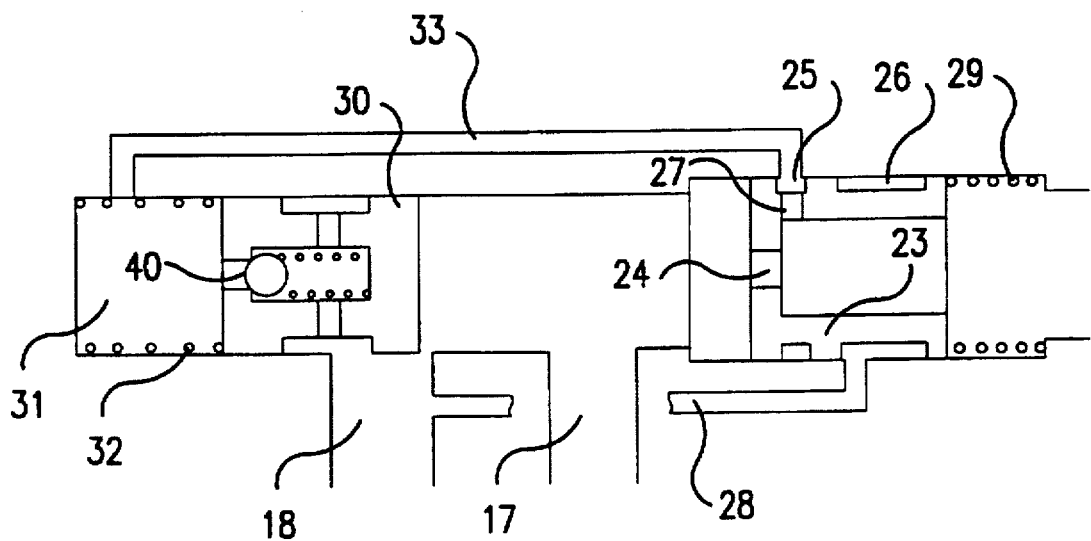
FIG. 4 is a diagram corresponding to FIG. 3 for explaining operation of the flow control unit according to the first embodiment when a pump is normally driven.

At this time, a high differential pressure is generated across the metering orifice 24 because the metering orifice 24 effectively restricts the flow of the operating fluid. This differential pressure makes the switching valve 23 axially slide against the spring 29. The switching valve 23 is thus switched to such position that the first annular groove 25 is communicated with the connection passage 33, as shown in FIG. 4. The differential pressure across the metering orifice 24 acts on both opposite end surfaces of the spool 30 of the flow control valve 34. An opening area of the bypass passage 18 to the supply passage 17 is adjusted to maintain the differential pressure constant. Therefore, the operating fluid of a predetermined amount is supplied to the control valve 14 through the metering orifice 24, with the excess amount thereof being bypassed to the bypass passage 18. Namely, the flow control valve 34 performs the normal flow control.

Upon rotation of the steering wheel 13, the opening areas of one pair of variable orifices V1, V3 and V2, V4 increase while the opening areas of the other pair decrease dependent upon the rotational direction thereof, whereby the pressure in one of chambers of the power cylinder 12 is increased to start the power assist.

In the situation where the control valve 14 is relatively rotated at the maximum rotational angle upon rotation of the steering wheel 13 such as a steering at stoppage, the pressure in the pump 10 is extremely increased. When the pressure in the pump 10 exceeds a preset pressure P set by the relief valve 40, the relief valve 40 actuates to prevent the pressure in the pump 10 from rising even more. Under such state, the operating fluid having a high pressure which is maintained by the relief valve 40 is inwardly circulated in the pump 10. Since a normal circulation that the operating fluid passing through the control valve 14 is returned to the pump 10 through the reservoir 11 is not carried out, the well-known cooling operation for the operating fluid is not performed on a drain passage connecting the control valve 14 to the reservoir 11. The circulation of the operating fluid having the high pressure in the pump 10 effects an increase in the temperature of the operating fluid.

Figure 5:
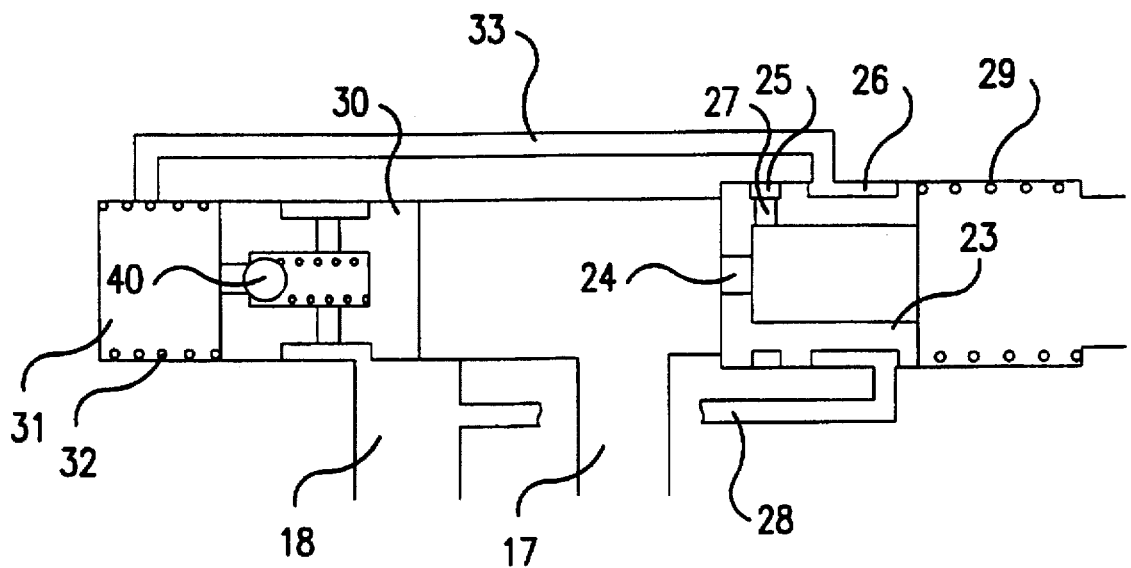
FIG. 5 is a diagram corresponding to FIG. 3 for explaining operation of the flow control unit according to the first embodiment under a relatively low differential pressure across the metering orifice.
Figure 6:
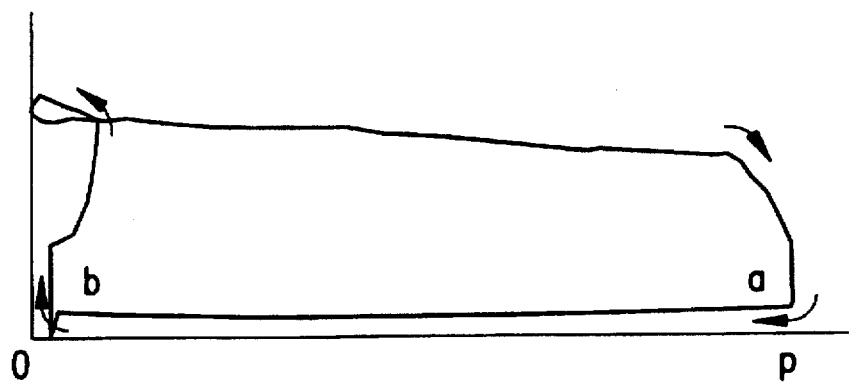
FIG. 6 is a characteristic diagram showing the relationship between a discharge pressure and a discharge flow rate of the pump according to the first embodiment.

On the contrary, in the embodiment of this invention, FIG. 5 shows the condition of the flow control unit during the rotation of the control valve 14 at the maximum rotational angle. At this time, the variable orifices V1, V3 or the variable orifices V2, V4 are closed, and the operating fluid supplied from the pump 10 does not flow through the metering orifice 24 because of interception by the control valve 14. Therefore, the differential pressure across the metering orifice 24 is gradually decreased and the switching valve 23 is returned by the spring 29 to the original position. The switching valve 23 is thus switched to such position that the second annular groove 26 is communicated with the connection passage 33. Under this condition, the spring chamber 31 of the flow control valve 34 is released to the low-pressure side (bypass passage 18) through the connection passage 33, the second annular groove 26 and the detour path 28 to lower the pressure therein. As a result, the spool 30 is displaced to the left as viewed in FIG. 5 to open the bypass passage 18 even more. The operating fluid intercepted by the control valve 14 is therefore drained from the bypass passage 18 to the reservoir 11. As is readily understood from FIG. 6 which shows an experimentally obtained characteristic of the discharge pressure and the discharge flow rate of the pump 10, the discharge pressure of the pump 10 is immediately lowered from the relief pressure P, as shown between a and b An FIG. 6.

When the steering wheel 13 is rotated in the opposite direction therefrom, the closed variable orifices V1, V3 or the variable orifices V2, V4 begin to open. This allows the operating fluid to flow into the control valve 14 through the metering orifice 24. The high differential pressure is again generated across the metering orifice 24, and the switching valve 23 is moved against the spring 29 to a position such that the first annular groove 25 is opened to the connection passage 33. The differential pressure across the metering orifice 24 acts on the both opposite end surfaces of the spool 30 of the flow control valve 34, so that the normal flow control is again performed by the flow control valve 34. This condition is the same as that shown in FIG. 4.

As described above, the power steering apparatus of the present invention is provided with the switching valve 23 switched in response to the differential pressure across the metering orifice 24. In case of a relatively low differential pressure across the metering orifice 24, the spring chamber 31 of the flow control valve 34 is released to the low-pressure side. With this configuration, even when the steering wheel 13 is held at the maximum rotational angle and when the driver rotates the steering wheel 13 forcibly under the condition that the road wheels are mired in a ditch, the high relief pressure is not maintained in the pump 10. Consequently, it can be prevented that the temperature of the operating fluid is raised to bring the pump 10 into seizure. Further, the load on an engine can be lightened, resulting in improvement of the fuel consumption.

Figure 7:
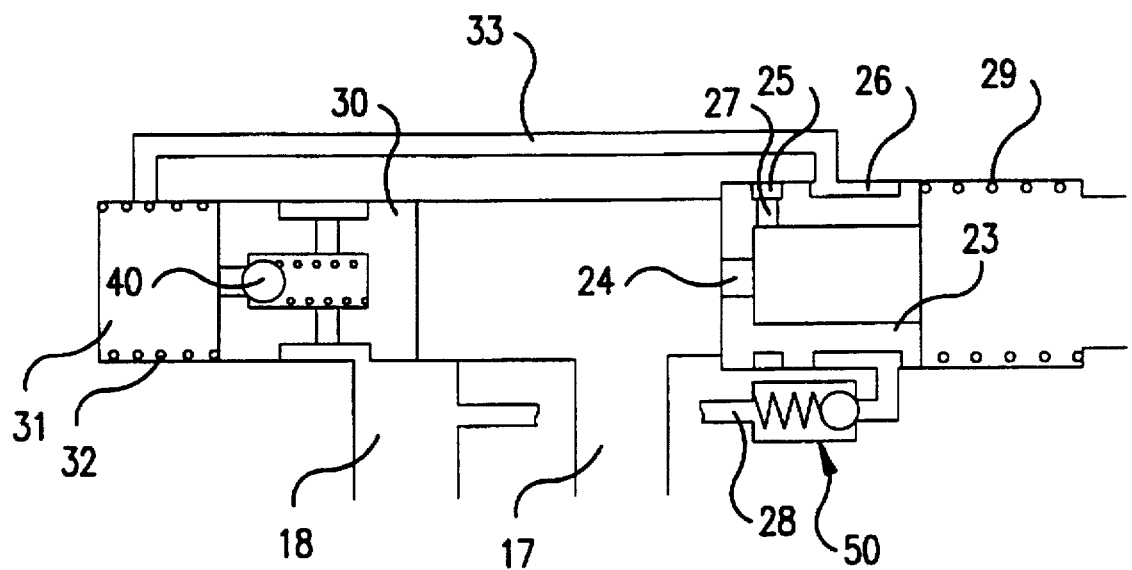
FIG. 7 is a schematic diagram of a flow control unit according to the second embodiment.
Figure 8:
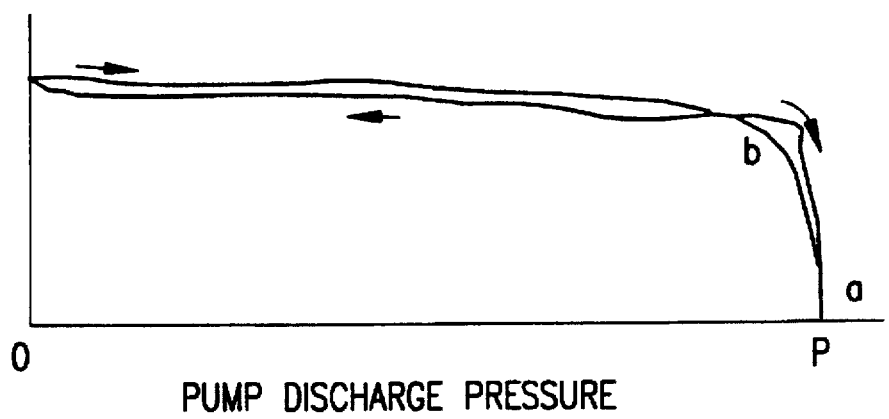
FIG. 8 is a characteristic diagram showing the relationship between a discharge pressure and a discharge flow rate of the pump according to the prior art.

Next, the second embodiment of the present invention will be described with reference to FIG. 7. The flow control unit according to the second embodiment has a similar constitution to that shown in FIG. 2, and is further provided with an another relief valve 50 on the detour path 28 so that the pressure in the spring chamber 31 of the flow control valve 34 is maintained to an optional value set for the relief valve 50 when the spring chamber 31 is released to the low-pressure side through the second annular groove 26 of the switching valve 23.

The relief valve 50 arranged on the detour path 28 allows the operating fluid to flow only from the second annular groove 26 of the switching valve 23 to the bypass passage 18. The relief valve 50 is actuated by a pressure lower than the relief pressure of the flow control valve 34 which is the maximum allowable value. Due to the relief valve 50 constructed above, the pressure in the spring chamber 31 can be maintained to that set for the relief valve 50 even when the variable orifices V1–V4 of the control valve 14 are closed upon the rotation of the steering wheel 13 at the maximum rotational angle.

In the above-described embodiments, the switching valve 23 and the flow control valve 34 are coaxially arranged in the pump housing 15. However, numerous modifications regarding these arrangements are possible within the teachings of the present invention that the spring chamber 31 of the flow control valve 34 is brought into communication with either low-pressure side or the downstream side of the metering orifice 24, by means of the switching valve 23.

Further, although the switching valve 23 actuates in response to the differential pressure across the metering orifice 24 for the flow control valve 34, an orifice other than the metering orifice 24 may be used for the switching valve 23.

Obviously, numerous modifications and variations of the present invention are possible in light of the above teachings. It is therefore to be understood that within the scope of the appended claims, the present invention may be practiced otherwise than as specifically described herein.

What is claimed is:

1. A power steering apparatus comprising:

a pump for supplying operating fluid;

a power cylinder having a pair of fluid chambers and being operable to generate an assist force;

a control valve having variable throttles which are arranged on paths connected to said pump, both fluid chambers of said power cylinder, and a reservoir;

an orifice arranged on a supply passage leading the operating fluid discharged from said pump to said control valve;

a flow control valve which has a spring chamber connected to said supply passage downstream of said orifice and responsive to the pressure difference across said orifice for regulating the flow rate of the operating fluid to said control valve to an almost constant flow rate; and switching valve responsive to the differential pressure across said orifice for switching the communication of said spring chamber of said flow control valve between the downstream of said orifice and said reservoir.

2. A power steering apparatus according to claim 1, wherein said switching valve brings said spring chamber of said flow control valve into communication with said reservoir when the differential pressure across said orifice is relatively low.

3. A power steering apparatus according to claim 1, wherein said switching valve comprises a first annular groove to which the operating fluid passing through said orifice is led and a second annular groove connected to said reservoir, and wherein said switching valve is switched in response to the differential pressure across said orifice to the position that either said first or second annular grooves is communicated with said spring chamber of said flow control valve.

4. A power steering apparatus according to claim 3, wherein said switching valve is switched to the position that said second annular groove is communicated with said spring chamber of said flow control valve when the differential pressure across said orifice is relatively low.

* * * * *